United States Patent
Ksieski

[15] 3,758,123
[45] Sept. 11, 1973

[54] OMEGA SEAL
[75] Inventor: Kazimierz T. Ksieski, Inglewood, Calif.
[73] Assignee: Parker-Hannifin Corporation, Cleveland, Ohio
[22] Filed: Feb. 19, 1970
[21] Appl. No.: 12,544

[52] U.S. Cl. .................................................277/206
[51] Int. Cl. ..............................................F16j 15/08
[58] Field of Search ......................277/205, 206, 215

[56] References Cited
UNITED STATES PATENTS
1,926,107  9/1933  Morehead..............277/206 X
3,240,501  3/1966  Smith.....................277/206 X FOREIGN PATENTS OR APPLICATIONS
1,550,745  11/1968  France......................277/206
1,424,864  12/1965  France......................277/206
869,453   7/1949   Germany...................277/206

Primary Examiner—William F. O'Dea
Assistant Examiner—Robert I. Smith
Attorney—Diller, Brown, Ramik & Holt

[57] ABSTRACT

This disclosure relates to a seal of omega cross sectional shape having a middle portion or central loop which is reinforced by being radially corrugated thereby providing a higher elastic deflection and a higher recovery than a conventional omega seal of like dimensions.

7 Claims, 5 Drawing Figures

PATENTED SEP 11 1973　　3,758,123
FIG.1
FIG.2
FIG.3
FIG.4
FIG.5
INVENTOR
KAZIMIERZ T. KSIESKI
ATTORNEYS
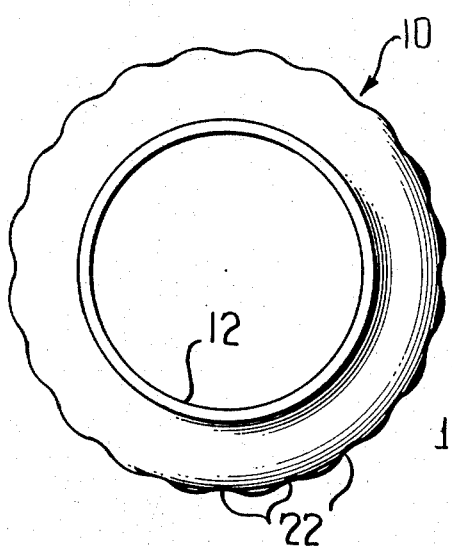
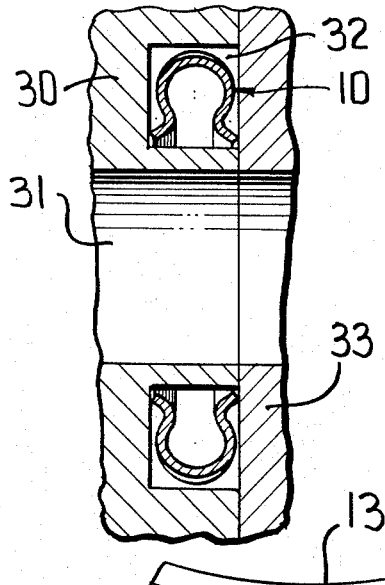
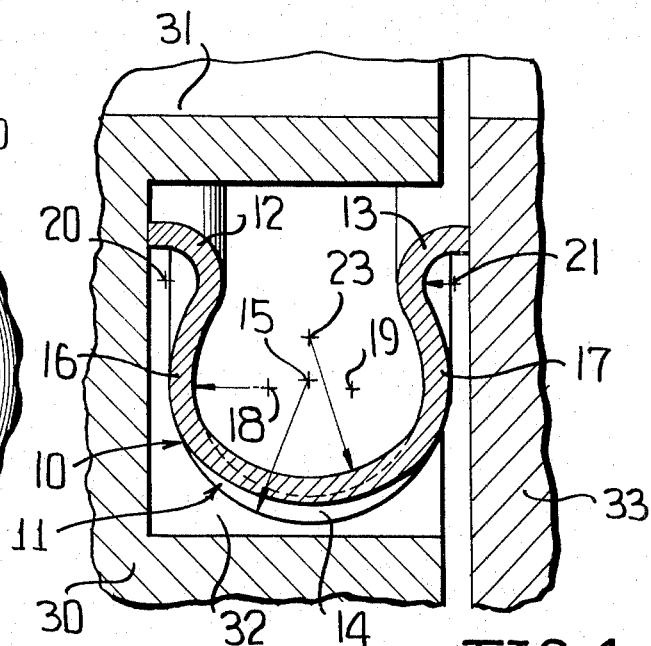
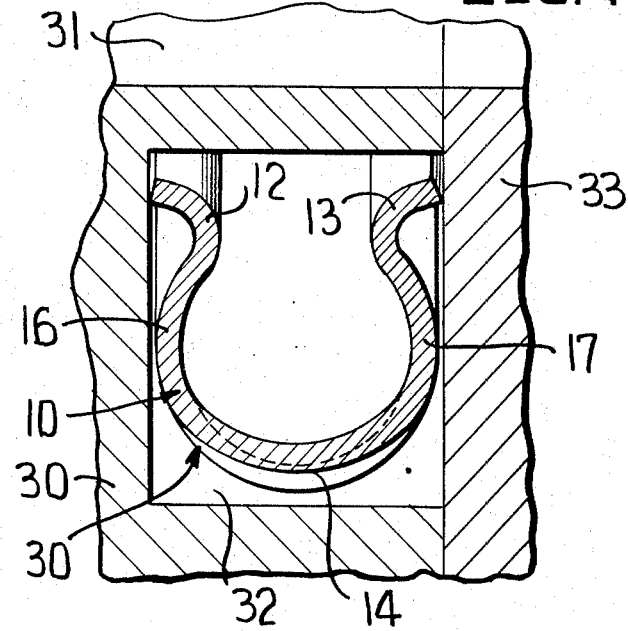
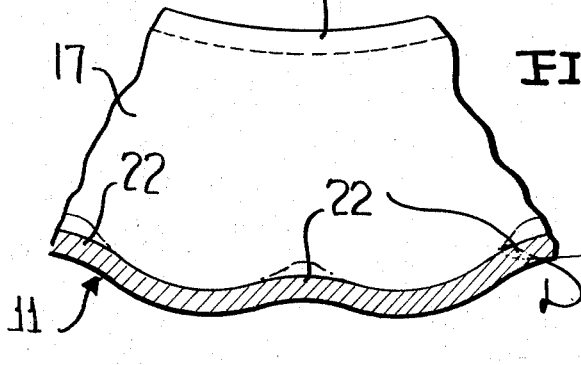

OMEGA SEAL

This invention relates in general to new and useful improvements in seal configuration, and more particularly to a reinforced omega seal, i.e. a seal in radial cross section having the general appearance of the upper case form of the Greek letter omega.

Omega seals basically are formed of a central loop and terminal legs. If the legs are treated from a stress standpoint as two beams joined at their base by the loop, maximum bending moment and consequently highest bending stress occurs at the loop middle. The load which the seal can take and seal recovery or elastic spring-back depend primarily on rigidity of the loop middle portion. Undesirably, flow of material during the seal extrusion process often results in the loop middle portion being thinner than the legs.

In accordance with the foregoing, a primary object of this invention is to provide an omega seal having the loop middle portion thereof reinforced to increase the stiffness of the seal.

Another object of this invention is to increase the stiffness of an omega seal by reinforcing the loop without increasing the thickness thereof.

Another feature of this invention is to increase the stiffness of an omega seal loop by providing a number of indentations or flutes at the outer circumference thereof.

A further feature of this invention is to form the aforementioned indentations or flutes during the extrusion process.

The indentations formed in accordance with the foregoing are in the form of circumferential corrugations with the indentations being a maximum at the middle of the loop and diminishing towards the ends thereof.

With the above and other objects in view that will hereinafter appear, the nature of the invention will be more clearly understood by reference to the following detailed description, the appended claims and the several views illustrated in the accompanying drawing:

In the drawing:

FIG. 1 is a plan view of an omega seal formed in accordance with this invention.

FIG. 2 is a sectional view through a typical seal installation.

FIG. 3 is an enlargement of a portion of FIG. 2 showing the seal being compressed.

FIG. 4 is a view similar to FIG. 3 showing the seal fully installed.

FIG. 5 is a fragmentary radial section through the seal.

Referring to the drawing, the omega seal, generally designated 10, is preferably annular in outline and in radial section includes a loop 11 and legs 12,13. Loop 11 includes central portion 14 having a center at 15 and end portions 16,17 having centers 18,19. Legs 12,13 are reversed continuations of end portions 16,17 and have centers 20,21.

Central portion 14 is circumferentially corrugated, as best shown in FIG. 5, through the formation of uniformly spaced indentations or flutes 22. Each indentation 22 is circumferentially curved and in equatorial section has centers spaced radially of center 15 varying distances with the maximum that of center 23, FIG. 3. In radial section each indentation 22 is a maximum at the center of central portion 14 and diminishes to zero substantially at end portions 16, 17. Seal 10 remains of uniform thickness throughout the entire section thereof.

Central portion 14, having the highest bending stress, is normally the area of maximum bending. However, due to circumferential corrugating of central portion 14, circumferentially adjacent radial sections of central portion 14 have different centers, varying from center 15 radially inwardly to center 23, and a resultant added beam strength. In order for central portion 14 to properly bend in radial section, central portion 14 must return to a uniform radius in radial section, i.e. corrugations due to indentations 22 must flatten out.

The requirement of central portion 14 to bend circumferentially in addition to the normal bending in a radial section greatly increases resistance of central portion 14 to bending without increase of material for seal 10.

A typical installation of seal 10 is shown in FIGS. 2, 3, 4. Member 30 having bore 31 is formed with annular groove 32 in one end. Groove 32 is sufficiently wide to loosely receive seal 10 but too shallow to fully receive seal 10, FIG. 3.

Seal 10 seals member 30 to member 33 which forces seal 10 to position fully within groove 32, FIG. 4. Legs 12,13 move together stressing and bending loop 11 with legs 12,13 retained in resilient sealing contact with members 30,33 and forming a seal therebetween. Because of increased resistance to bending of central portion 14, greater sealing pressure contact between legs 12,13 and members 30,33 occurs.

The obvious advantage of seal 10 is that a greater sealing capacity within an available space is possible. Also, no additional material is required in forming seal 10.

Although only a preferred embodiment of seal configuration has been specifically disclosed, it is to be understood that variations may be made therein without departing from the spirit and scope of the invention, as defined by the appended claims.

I claim:

1. A seal of upper case omega cross sectional shape having a central loop and a pair of terminal legs, said seal being characterized by said central loop having a means providing a reinforced central portion providing for an increase in resistance to elastic deflection, said reinforced central portion being of a corrugated configuration.

2. The omega seal of claim 1 wherein said central loop is of a uniform thickness.

3. The omega seal of claim 1 wherein said corrugations are primarily radial.

4. The omega seal of claim 1 wherein said corrugations are primarily radial and merge into end portions of said central loop.

5. The omega seal of claim 1 wherein said corrugations have a maximum extent of 180° about the transverse section of said central loop and are a maximum at the center of said central loop.

6. The omega seal of claim 1 wherein said corrugations have a maximum extent of 180° about the transverse section of said central loop and are a maximum at the center of said central loop with said corrugations tapering from a maximum to zero.

7. The omega seal of claim 1 wherein said corrugations are primarily radial and spaced circumferentially.

* * * * *